United States Patent
Ando (10) Patent No.: US 7,140,246 B2
(45) Date of Patent: Nov. 28, 2006

(54) FREQUENCY OUTPUT TYPE HOT-WIRE FLOW METER

(75) Inventor: Ryo Ando, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/755,376

(22) Filed: Jan. 13, 2004

(65) Prior Publication Data
US 2004/0200275 A1    Oct. 14, 2004

(30) Foreign Application Priority Data
Jan. 14, 2003    (JP)    ............... 2003-006053

(51) Int. Cl.
*G01F 1/68* (2006.01)
(52) U.S. Cl. .................................... 73/204.18
(58) Field of Classification Search ............. 73/204.11, 73/204.18, 204.19; 702/45, 46, 47, 50, 100
See application file for complete search history.

(56) References Cited

U.S. PATENT DOCUMENTS

| | | | |
|---|---|---|---|
| 4,334,186 A * | 6/1982 | Sasayama et al. | ......... 323/365 |
| 5,525,040 A | 6/1996 | Andreae et al. | |
| 2003/0041664 A1 * | 3/2003 | Ariyoshi | ............... 73/204.26 |

FOREIGN PATENT DOCUMENTS

| | | |
|---|---|---|
| EP | 0240637 | 10/1987 |
| EP | 1118842 | 7/2001 |
| EP | 1338871 | 8/2003 |
| JP | 55-104719 | 8/1980 |
| JP | 6-160141 | 6/1994 |
| JP | 8-015339 | 1/1996 |
| JP | 08-062012 | 3/1996 |
| JP | 08-094406 | 4/1996 |
| JP | 11-190647 | 7/1999 |
| JP | 11-337382 | 12/1999 |
| JP | 2002-168670 | 6/2000 |

* cited by examiner

Primary Examiner—Harshad Patel
(74) Attorney, Agent, or Firm—Mattingly, Stanger, Malur & Brundidge, P.C.

(57) ABSTRACT

According to the invention, to correct the curvature characteristic in output due to individual differences between frequency output type hot-wire flow meters, a frequency output type hot-wire flow meter includes a heating resistor disposed in the measurement target fluid and a voltage frequency conversion circuit for converting the air flow rate voltage signal that is proportional to the current flowing through the heating resistor. The voltage frequency conversion circuit converts the air flow rate voltage signal non-linearly to generate the output frequency.

10 Claims, 8 Drawing Sheets

FREQUENCY OUTPUT TYPE HOT-WIRE FLOW METER

FIELD OF THE INVENTION

This invention relates to a frequency output type hot-wire flow meter that is used suitably for measurement of air flow rate.

BACKGROUND OF THE INVENTION

An exemplary conventional frequency output type hot-wire flow meter is described with reference to FIG. 12. The frequency output type hot-wire flow meter comprises a heating resistor 101 disposed in measurement target air flow, a fixed resistor 102 connected to the heating resistor 101 in series, a buffer circuit 103, and a voltage frequency conversion circuit 104. The target air mass flow is measured based on the heating resistor current I101 that flows through the heating resistor 101. The measurement principle of flow rate for the hot-wire flow meter is well known and the detailed description of the measurement principle is omitted herein.

The air flow rate voltage signal Vi proportional to the heating resistor current I101 is obtained from the heating resistor current I101. The air flow rate voltage signal Vi is supplied to the voltage frequency conversion circuit 104 through the buffer circuit 103. The voltage frequency conversion circuit 104 converts the air flow rate voltage signal Vi linearly to generate the output frequency Fo as described below.

An exemplary voltage frequency conversion circuit 104 is described with reference to FIG. 13. The voltage frequency conversion circuit 104 comprises two constant current sources 11 and 12, a switch 15, a switch change-over circuit 19 for generating a switch change-over signal, and an integrating capacitor 21 connected to the output side of the switch 15, and a buffer circuit 27.

Two constant current sources 11 and 12 receive the air flow rate voltage signal Vi and output the air flow rate current signal Ii that is proportional to the air flow rate voltage signal Vi respectively. Two constant current sources 11 and 12 may be, for example, a current mirror circuit. One of the two constant current sources is connected to the integrating capacitor 21 by means of the switch 15. When the first constant current source 11 is connected to the integrating capacitor 21, the air flow rate current signal Ii flows in such a direction that charges are accumulated in the integrating capacitor 21. As the result, the voltage Vic of the integrating capacitor 21 rises. When the second constant current source 12 is connected to the integrating capacitor 21, the air flow rate current signal flows in such a direction that charges are released from the integrating capacitor 21. As the result, the voltage Vic of the integrating capacitor 21 falls.

The changing rate of the voltage Vic of the integrating capacitor 21 is proportional to the air flow rate current signal Ii. In other words, the changing rate of the voltage Vic of the integrating capacitor 21 is proportional to the air flow rate voltage signal Vi.

Figure 14:
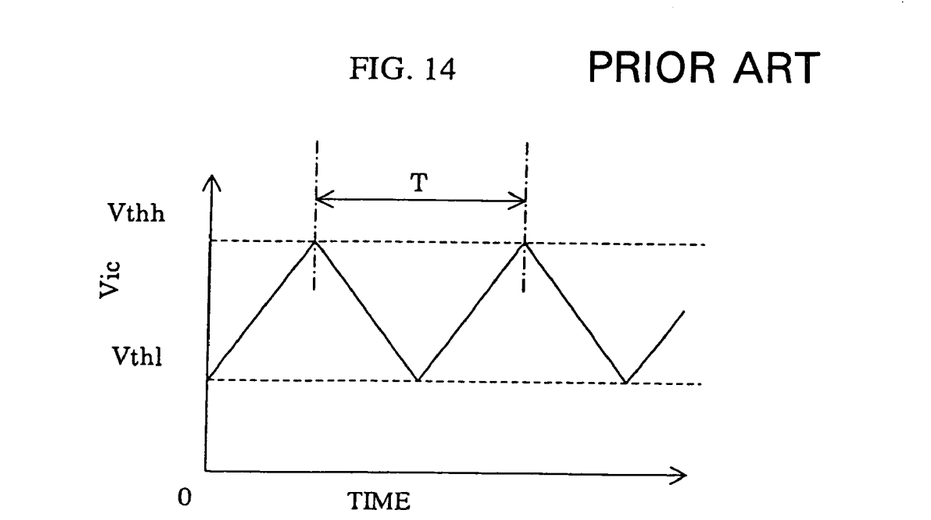
FIG. 14 is a diagram for describing the operation of the voltage frequency conversion circuit shown in FIG. 13.

Operation of the voltage frequency conversion circuit 104 is described with reference to FIG. 14. The switch change-over circuit 19 has an upper limit threshold voltage Vthh and a lower limit voltage Vthl(Vthh>Vthl) and compares the voltage Vic of the integrating capacitor 21 with the threshold voltage to generate a change-over signal. If the voltage Vic of the integrating capacitor 21 is lower than the upper threshold voltage Vthh, the switch change-over circuit 19 generates a change-over signal so that the first constant current source 11 is connected to the integrating capacitor 21. As the result, the voltage Vic of the integrating capacitor 21 rises.

When the voltage Vic of the integrating capacitor 21 reaches the upper threshold voltage Vthh, the switch change-over circuit 19 generates a change-over signal so that the second constant current source 12 is connected to the integrating capacitor 21. As the result, the voltage Vic of the integrating capacitor 21 falls. When the voltage Vic of the integrating capacitor 21 reaches the lower threshold voltage Vthl, the switch change-over circuit 19 generates a change-over signal so that the first constant current source 11 is connected to the integrating capacitor 21. As the result, the voltage Vic of the integrating capacitor 21 rises.

The buffer circuit 27 generates a voltage signal that corresponds to the voltage Vic of the integrating capacitor 21. Therefore triangular waves are generated as shown in FIG. 14.

As described hereinabove, the changing rate of the voltage Vic of the integrating capacitor 21 is proportional to the air flow rate current signal Ii. Therefore the gradient of the triangular wave is proportional to the air flow rate current signal Ii. The larger gradient of the triangular wave results in the larger frequency Fo of the triangular wave, and the smaller gradient of a triangular wave results in the smaller frequency Fo of the triangular wave. Therefore the frequency Fo of the triangular wave is proportional to the air flow rate current signal Ii. In other words, the frequency Fo of the triangular wave is proportional to the air flow rate voltage signal Vi. The frequency Fo of the triangular wave output from the voltage frequency conversion circuit 104 is represented according to the following equation.

$$Fo = Vi/(R \cdot C \cdot dVth) = Ii/(C \cdot dVth) \quad \text{Equation 1}$$

Wherein R denotes the resistance value of the fixed resistor 10 connected to the air flow rate voltage signal Vi, C denotes the electrostatic capacity of the integrating capacitor 21, and dvth denotes the rage of change of the voltage Vic of the integrating capacitor 21, namely the difference between the maximum value and the minimum value. R, C, and dvth are all constant values.

As represented according to the equation 1, the air flow rate voltage signal Vi is converted linearly to obtain the output frequency Fo in the voltage frequency conversion circuit 104 of the conventional frequency output type hot-wire flow meter. The period T of a triangular wave is represented according to the following equation.

$$T = 1/Fo = (1/Vi) \cdot (R \cdot C \cdot dVth) \quad \text{Equation 2}$$
$$= (1/Ii) \cdot (C \cdot dVth)$$

Figure 15A:
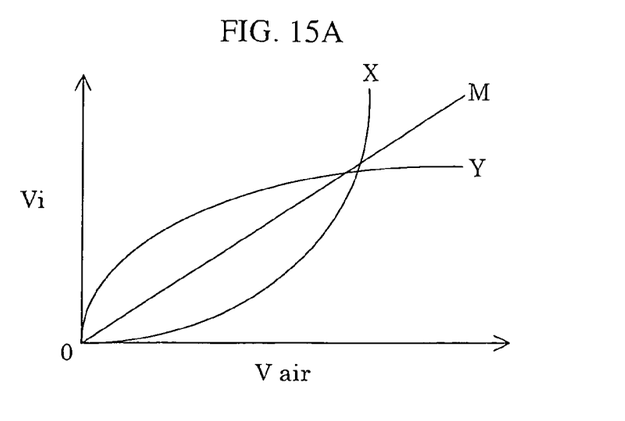
FIGS. 15A, 15B, and 15C are graphs for describing the curvature characteristic of the frequency output type hot-wire flow meter.

Curvature of an output of the conventional frequency output type hot-wire flow meter that is caused by the difference between individual hot-wire flow meters is described with reference to FIG. 15A, FIG. 15B, and FIG. 15C. FIG. 15A is a graph showing the relation between the actual air flow rate Vair and the air flow rate voltage signal Vi obtained from the heating resistor. The straight line M shows an exemplary standard characteristic of the frequency output type hot-wire flow meter. The curve X shows characteristic that deviates from the standard characteristic due to individual difference. In other words, the relation between the actual air flow rate Vair and the air flow rate voltage signal has a curvature deviated from the standard characteristic.

Figure 15B:
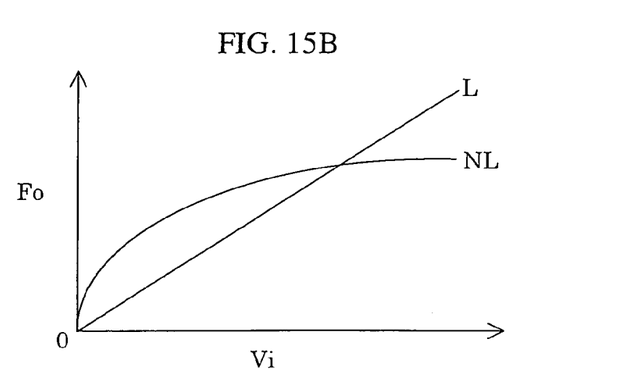

FIG. 15B shows the conversion relation between the air flow rate voltage signal Vi and the output frequency Fo. The straight line L shows the linear conversion relation between the air flow rate voltage signal Vi and the output frequency Fo, and shows the frequency conversion relation in the voltage frequency conversion circuit 104 of the conventional frequency output type hot-wire flow meter.

Figure 15C:
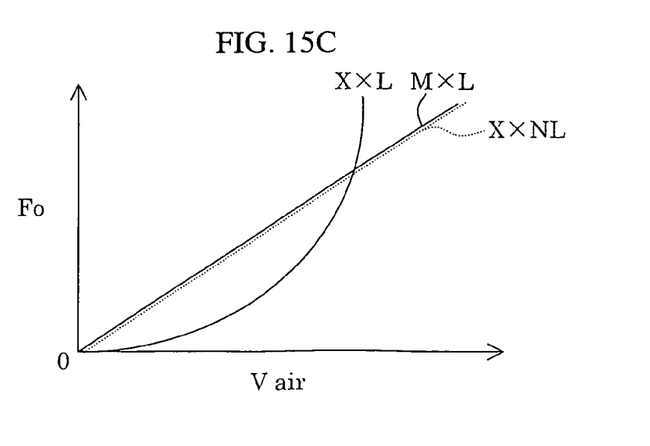

FIG. 15C shows the relation between the actual air flow rate Vair and the output frequency Fo obtained by converting the air flow rate voltage signal Vi according to the conversion relation shown in FIG. 15B. A curve M×L shown in FIG. 15C shows a result obtained by linearly converting the air flow rate voltage signal Vi obtained by means of the frequency output type hot-wire flow meter having the standard characteristic shown by the straight line M in FIG. 15A according to the straight line L shown in FIG. 15B. A curve X×L shown in FIG. 15C shows a result obtained by linearly converting the air flow rate voltage signal Vi by means of the frequency output type hot-wire flow meter having the curvature characteristic shown by the curve X in FIG. 15A according to the straight line L shown in FIG. 15B.

As it is obvious from the comparison between the curve M×L and the curve X×L, the frequency output type hot-wire flow meter having the standard characteristic shows a linear relation between the actual air flow rate Vair and the output frequency Fo, but on the other hand the frequency output type hot-wire flow meter having the curvature characteristic shows a non-linear relation between the actual air flow rate Vair and the output frequency Fo. For example, a product that shows characteristic of the straight line M×L may pass inspection, but a product that shows characteristic of the curve X×L may not pass inspection.

A standard characteristic is shown by the straight line M in FIG. 15A, but the standard characteristic may be a curve. The curve X shown in FIG. 15A is an exemplary curvature characteristic, and curvature characteristic can be various as shown by a curve Y.

The voltage output type air flow meter has been known as well as the frequency output type air flow meter. A technique for correcting the non-linear characteristic relation between the mass flow rate of the measurement target and the output voltage signal has been known. JP-A No. 190647/1999 discloses a technique of correction arithmetic using a microcomputer for the voltage output type hot-wire flow meter.

JP-A No. 337382/1999, JP-A No. 94406/1996, and JP-A No. 62012/1996 disclose techniques for correcting non-linear characteristic using a linearizing circuit for the voltage output type hot-wire flow meter.

However, these techniques are used to correct non-linear characteristic, but are not used to correct the curvature characteristic of output due to individual difference between flow meters. A negative feedback amplifier circuit using an operational amplifier corrects the output of the above-mentioned linearizing circuit. The curvature characteristic of output cannot be corrected by this technique because the flow rate signal and the output signal are in a linear relation.

[Patent document 1]
JP-A No. 190647/1999
[Patent document 2]
JP-A No. 337382/1999
[Patent document 3]
JP-A No. 94406/1996
[Patent document 4]
JP-A No. 62012/1996

As described hereinabove, the frequency output type hot-wire flow meter causes the curvature characteristic of output due to individual difference between fluid passages and heating resistors, and due to change of production line, production lot, and the likes.

SUMMARY OF THE INVENTION

It is an object of the present invention to provide a frequency output type hot-wire flow meter that is capable of correcting the curvature characteristic of output due to individual difference.

According to the present invention, a frequency output type hot-wire flow meter comprises a heating resistor disposed in measurement target fluid and a voltage frequency conversion circuit for converting an air flow rate voltage signal obtained from the heating resistor to a frequency, wherein the voltage frequency conversion circuit generates an output frequency that is non-linear with respect to the flow rate voltage signal.

In other words, according to the present invention, the conversion relation between the air flow rate voltage signal Vi and the output frequency Fo is non-linear as shown by the curve NL in FIG. 15B. Therefore, the air flow rate voltage signal Vi obtained by using a frequency output type hot-wire flow meter having the curvature characteristic shown by the curve X in FIG. 15A is converted to the frequency according to non-linear conversion shown by the curve NL in FIG. 15B to obtain the approximately linear characteristic X×NL that is similar to the standard characteristic M×L as shown by the curve X×NL in FIG. 15C.

According to the present invention, the curvature characteristic of the output of a frequency output type hot-wire flow meter is detected in the production process and corrected in the adjustment step, and as the result the production accuracy of the frequency output type hot-wire flow meter is improved.

According to the present invention, the curvature characteristic of the output of a frequency output type hot-wire flow meter can be controlled without using a correction LSI and a microcomputer.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Embodiments of the frequency output type hot-wire flow meter of the present invention will be described in detail hereinafter with reference to the drawings. Embodiments in which the fluid is air are described.

Figure 1:
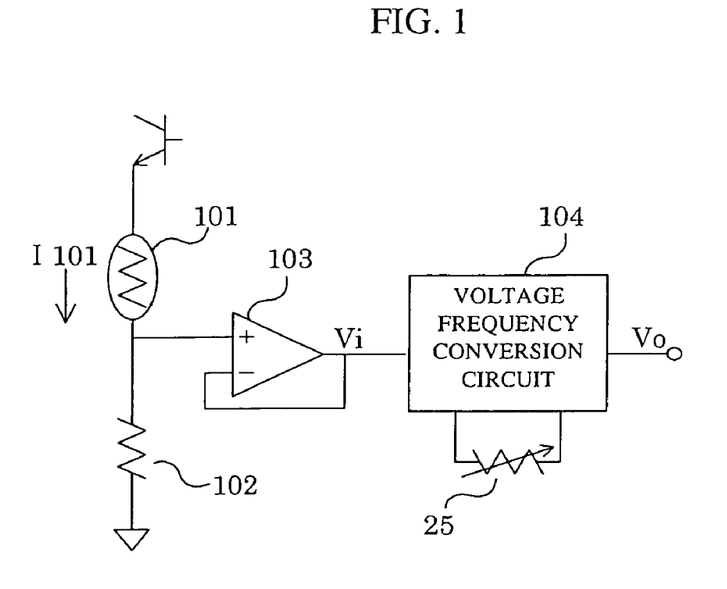
FIG. 1 is a diagram showing an exemplary frequency output type hot-wire flow meter in accordance with the present invention.

The concept of the frequency output type hot-wire flow meter of the present invention is described with reference to FIG. 1. A frequency output type hot-wire flow meter of this embodiment comprises a heating resistor 101 disposed in measurement target air flow, a fixed resistor 102 connected in series to the heating resistor 101, a buffer circuit 103, and a voltage frequency conversion circuit 104. The voltage frequency conversion circuit 104 has a correction resistor 25.

Figure 12:
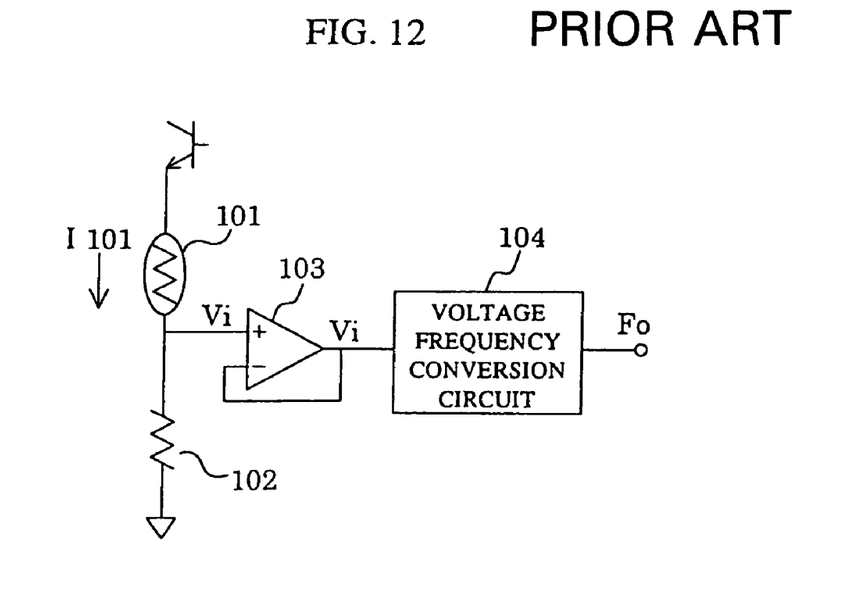
FIG. 12 is a diagram showing an exemplary conventional frequency output type hot-wire flow meter.

The frequency output type hot-wire flow meter of this embodiment is different from the conventional frequency output type hot-wire flow meter shown in FIG. 12 in that the voltage frequency conversion circuit 104 has the correction resistor 25. By providing the correction resistor 25, the air flow rate voltage signal Vi is converted non-linearly to the output frequency Fo as shown by the curve NL in FIG. 15B.

The air flow rate voltage signal Vi is obtained from the heating resistor current I101 that flows through the heating resistor 101. The air flow rate voltage signal Vi is supplied to the voltage frequency conversion circuit 104 through the buffer circuit 103. The voltage frequency conversion circuit 104 converts the air flow rate voltage signal Vi non-linearly to generate the output frequency Fo. The relation between the air flow rate voltage signal Vi and the output frequency Fo is represented by the following equation.

$$Fo = Vi/[(R+A) \cdot C \cdot (dVth+B)+D \cdot Vi] \qquad \text{Equation 3}$$

Where A, B, and C denote variable values. The period T of the triangular wave generated in the voltage frequency conversion circuit 104 is represented by the following equation.

$$T = 1/Fo = (1/Vi) \cdot (R+A) \cdot C \cdot (dVth+B)+D \qquad \text{Equation 4}$$

In comparison of Equation 4 with Equation 3, the fixed resistor R is substituted with (R+A), the variable value dVth of the voltage Vic of the integrating capacitor 21 is substituted with (dVth+B), and a delaying constant D that is not dependent on the air flow rate voltage signal Vi is added.

Accordingly the period T of the triangular wave changes non-linearly with respect to the air flow rate voltage signal Vi in this embodiment as shown in Equation 4. A desired non-linearity can be obtained by selecting the values of A, B, and D properly. The curvature characteristic of the output can be corrected to obtain a desired form by selecting the values of A, B, and D properly. An exemplary selection is described below.

Figure 2:
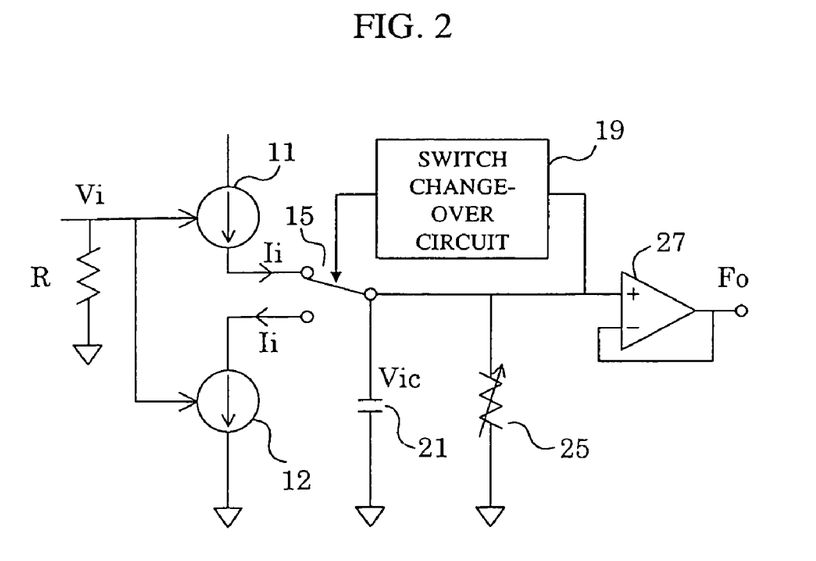
FIG. 2 is a diagram showing the first embodiment of the voltage frequency conversion circuit of the frequency output type hot-wire flow meter in accordance with the present invention.

The first embodiment of the voltage frequency conversion circuit of the frequency output type hot-wire flow meter of the present invention is described with reference to FIG. 2. The voltage frequency conversion circuit of the present embodiment comprises two constant current sources 11 and 12 for supplying the air flow rate current signal Ii that is proportional to the air flow rate voltage signal Vi, a switch 15 for changing over between the two constant current sources 11 and 12, a switch change-over circuit 19 for generating a change-over signal to change over the switch 15, an integrating capacitor 21, a correction resistor 25, and a buffer circuit 27.

Figure 13:
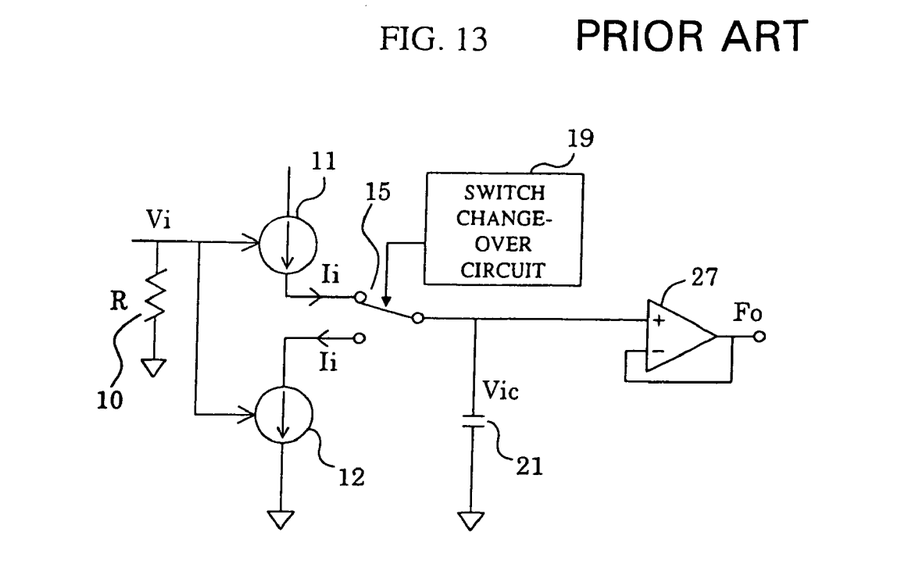
FIG. 13 is a diagram showing an exemplary voltage frequency conversion circuit of the conventional frequency output type hot-wire flow meter.

The voltage frequency conversion circuit of this embodiment is different from the exemplary conventional voltage frequency conversion circuit shown in FIG. 13 in that the correction resistor 25 is added. The correction resistor 25 is connected to the integrating capacitor 21 in parallel to realize non-linear conversion from the air flow rate voltage signal Vi to the output frequency Fo. Non-linearity can be controlled by changing the value of resistance of the correction resistor 25. Relation between the air flow rate voltage signal Vi and the output frequency Fo is represented by the following equation.

$$\begin{aligned} Fo &= Vi/(2 \cdot RC \cdot (Vthh - Vthl)) \\ &= Ii/(2C \cdot (Vthh - Vthl)) \end{aligned} \qquad \text{Equation 5}$$

In the above-mentioned example, the changing rate of the voltage Vic of the integrating capacitor 21 is not proportional to the air flow current signal Ii because the correction resistor 25 is added. Accordingly the gradient of the triangular wave is not proportional to the air flow rate current signal Ii.

When the first constant current source 11 is connected to the integrating capacitor 21, the air flow rate current signal Ii flows not only to the integrating capacitor 21 but also to the correction resistor 25. The air flow rate current signal Ii flowing through the correction resistor 25 causes the current flowing to the integrating capacitor 21 to decrease, and influences the rising rate of the voltage Vic of the integrating capacitor 21. If the air flow rate current signal Ii is large, the influence of the air flow rate current signal Ii flowing through the correction resistor 25 is not significant, but on the other hand if the air flow rate current signal is small, the influence of the air flow rate current signal Ii flowing through the correction resistor 25 is significant because the current that flows through the correction resistor 25 is constant.

If the air flow rate current signal Ii is large, the rising rate of the voltage Vic of the integrating capacitor 21 is approximately proportional to the air flow rate current signal Ii. In other words, the gradient of the triangular wave is proportional to the air flow rate current signal Ii. Accordingly the relation between the air flow rate current signal Vi and the output frequency Fo is linear.

However, if the air flow rate current signal Ii is small, the rising rate of the voltage Vic of the integrating capacitor 21 is not proportional to the air flow rate current signal Ii. In other words, the gradient of the triangular wave is not proportional to the air flow rate current signal Ii. Accordingly the relation between the air flow rate current voltage signal Vi and the output frequency Fo is non-linear as shown by the curve NL in FIG. 15B.

When the second constant current source 12 is connected to the integrating capacitor 21, the air flow rate current signal Ii flows out not only from the integrating capacitor 21 but also from the correction resistor 25. Then the voltage Vic of the integrating capacitor 21 falls. The air flow rate current signal Ii flows out also from the correction resistor 25 to influence the falling rate of the voltage Vic of the integrating capacitor 21. If the air flow rate current signal Ii is large, the influence of the air flow rate current signal Ii flowing through the correction resistor 25 is not significant, and on the other hand if the air flow rate current signal Ii is small, the influence of the air flow rate current signal Ii flowing through the correction resistor 25 is significant.

The changing rate of the voltage Vic of the integrating capacitor 21, not only in rising but also in falling, is non-linear with respect to the air flow rate current signal Ii due to the influence of the current that flows through the correction resistor 25. Accordingly the gradient of the triangular wave is non-linear with respect to the air flow rate current signal Ii, and the output frequency Fo is non-linear with respect to the air flow rate voltage signal Vi as shown by the curve NL in FIG. 15B.

Figure 3:
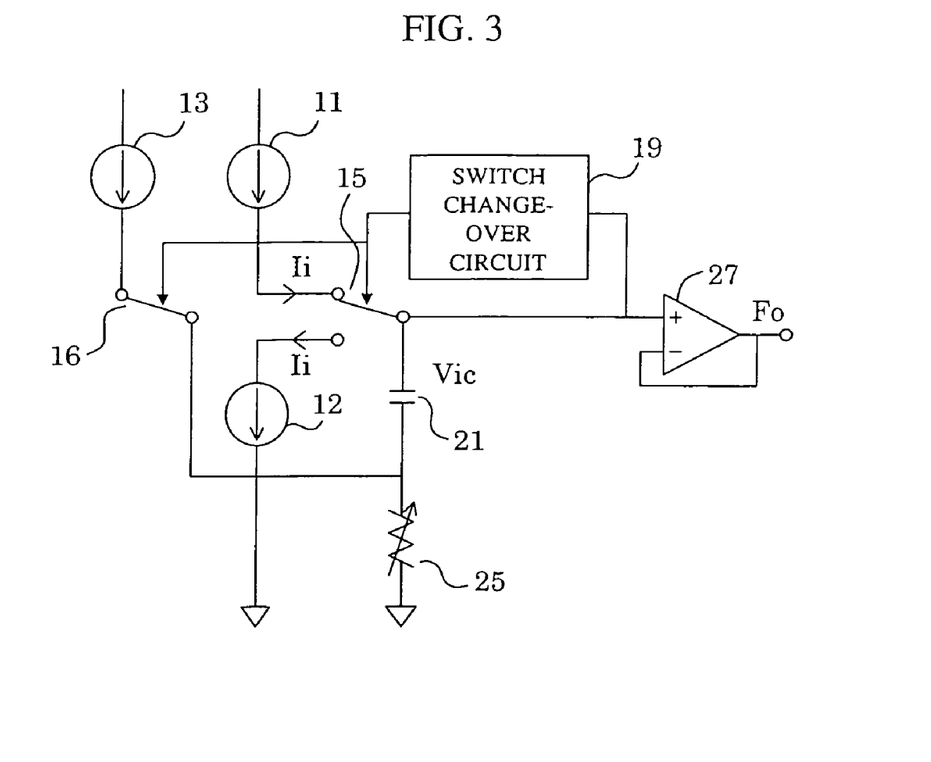
FIG. 3 is a diagram showing the second embodiment of the voltage frequency conversion circuit of the frequency output type hot-wire flow meter in accordance with the present invention.

The second embodiment of the voltage frequency conversion circuit of the frequency output type hot-wire flow meter of the present invention is described with reference to FIG. 3. The voltage frequency conversion circuit of the present embodiment comprises two constant current sources 11 and 12 for supplying the air flow rate current signal Ii that is proportional to the air flow rate voltage signal Vi, a third constant current source 13, a switch 15 for changing over between the two constant current sources 11 and 12, a second switch 16 for connecting or disconnecting the third constant current source 13, a switch change-over circuit 19 for generating a change-over signal for changing over the switches 15 and 16, an integrating capacitor 21, a correction resistor 25, and a buffer circuit 27.

The voltage frequency conversion circuit of this embodiment is different from the exemplary conventional voltage frequency conversion circuit shown in FIG. 13 in that the third constant current source 13 and the correction resistor 25 are added. Providing of the third constant current source 13 and the correction resistor 25 realizes non-linear conversion from the air flow rate voltage signal Vi to the output frequency Fo.

The integrating capacitor 21 and the correction resistor 25 are connected to each other in series, and the third constant current source 13 is connected to the connection point between the integrating capacitor 21 and the correction resistor 25 through the second switch 16. The third constant current source 13 outputs an auxiliary current Ii2 that is proportional to the air flow rate current signal Ii flowing to the first constant current source 11 and the second constant current source 12.

Non-linearity can be controlled by changing the auxiliary current Ii2 supplied from the third constant current source 13 and the resistance value of the correction resistor 25.

The second switch 16 is linked to the first switch 15, and both switches are operated by the same change-over signal. Accordingly when the first constant current source 11 is connected to the integrating capacitor 21, the third constant current source 13 is connected to the connection point between the integrating capacitor 21 and the correction resistor 25. The voltage V25 rises due to the auxiliary current Ii2 supplied from the third constant current source 13, wherein V25 denotes the voltage of the connection point between the integrating capacitor 21 and the correction resistor 25. The higher connection point voltage V25 results in the higher rising rate of the Vic of the integrating capacitor 21.

Hence, when the first switch 15 functions to connect the first constant current source 11 to the integration capacitor 21, the auxiliary current Ii2 is supplied from the third constant current source 13 to the connection point between the integrating capacitor 21 and the correction resistor 25. As the result, the time required for the voltage Vic of the integration capacitor 21 to reach the upper threshold voltage Vthh is shortened, and the gradient of the triangular wave rises. In other words, the period T is shortened and the output frequency Fo becomes high.

If the air flow rate current signal Ii is small, the auxiliary current Ii2 supplied from the third constant current source 13 is small and the voltage V25 of the connection point is low. Therefore the effect of the integration capacitor 21 on the voltage Vic is not significant. In other words, if the air flow rate current signal Ii is small, the relation between the air flow rate voltage signal Vi and the output frequency Fo is linear. However, if the air flow rate current signal Ii is large, the auxiliary current Ii2 supplied from the third constant current source 13 is large and the voltage V25 of the connection point is high. Therefore the effect of the integration capacitor 21 on the voltage Vic is significant. In other words, if the air flow rate current signal Ii is large, the relation between the air flow rate voltage signal Vi and the output frequency Fo is non-linear.

When the second constant current source 12 is connected to the integrating capacitor 21, the third constant current source 13 is disconnected from the connection point between the integrating capacitor 21 and the correction resistor 25. The air flow rate current signal Ii flows out from the integration capacitor 21 to the second constant current source 12. Then the voltage Vic of the integrating capacitor 21 falls. The falling rate of the voltage Vic of the integrating capacitor 21 is not influenced by the third constant current source 13.

Figure 4:
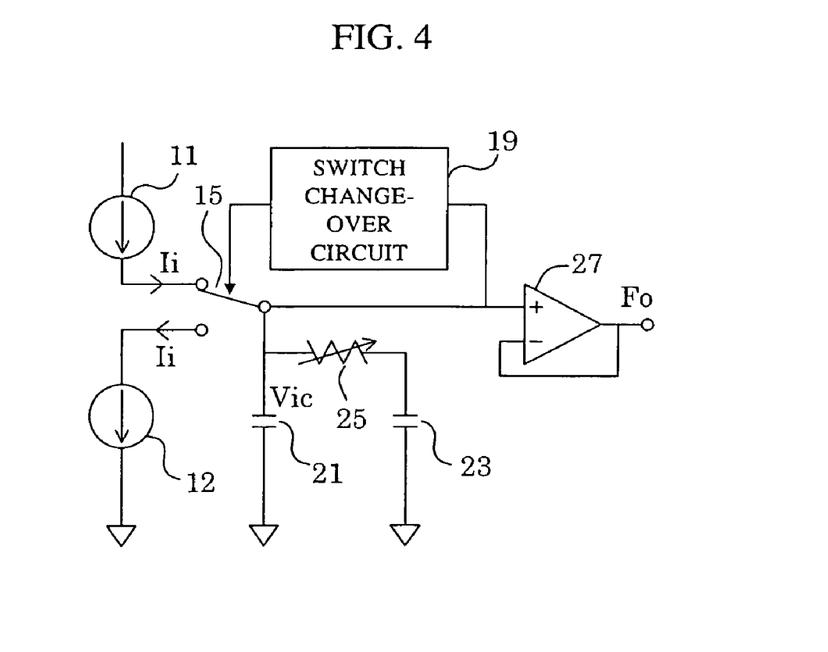
FIG. 4 is a diagram showing the third embodiment of the voltage frequency conversion circuit of the frequency output type hot-wire flow meter in accordance with the present invention.

The third embodiment of the voltage frequency conversion circuit of the frequency output type hot-wire flow meter of the present invention is described with reference to FIG. 4. The voltage frequency conversion circuit of this embodiment comprises two constant current sources 11 and 12 for supplying the air flow rate current signal Ii that is proportional to the air flow rate voltage signal Vi, a switch 15 for changing over between the two constant current sources 11 and 12, a switch change-over circuit 19 for generating a change-over signal to change over the switch 15, a correction resistor 25, two integrating capacitors 21 and 23, and a buffer circuit 27.

The voltage frequency conversion circuit of this embodiment is different from the exemplary conventional voltage frequency conversion circuit shown in FIG. 13 in that the correction resistor 25 and the second integrating capacitor 23 are provided.

In this embodiment, two integrating capacitors 21 and 23 are connected in parallel and the correction resistor 25 is connected between the two integrating capacitors 21 and 23 to thereby realize non-linear conversion from the air flow rate current signal Vi to the output frequency Fo. Non-linearity can be controlled by changing the resistance of correction resistor 25 and the electrostatic capacity of second integrating capacitor 23.

When the first constant current source 11 is connected to the integrating capacitor 21, the air flow rate current signal Ii flows not only to the integrating capacitor 21 but also through the correction resistor 25. The air flow rate current signal Ii flowing through the correction resistor 25 causes the current flowing through the integrating capacitor 21 to decrease and influences the rising rate of the voltage Vic of the integrating capacitor 21.

The larger air flow rate current signal Ii that flows through the first and second constant current sources 11 and 12 results in the larger voltage difference V25 of the correction resistor 25, wherein V25 denotes the voltage difference between terminals of the correction resistor 25. The larger voltage difference V25 of the correction resistor 25 results in less charges that are stored in the second integrating capacitor 23, and then the time required for the voltage Vic of the first integrating capacitor 21 to reach the upper threshold voltage Vthh is shortened and the gradient of the triangular wave becomes large. In other words, the period T is shortened and the output frequency Fo becomes higher.

On the other hand, the smaller air flow current signal Ii results in less voltage difference V25 of the correction resistor 25. The smaller voltage difference 25 of the correction resistor 25 has a less influence on the voltage Vic of the first integrating capacitor 21. In other words, the smaller air flow rate current signal Ii gives the linear relation between the air flow rate voltage signal Vi and the output frequency Fo, but the larger air flow rate current signal Ii gives the non-linear relation.

Figure 5:
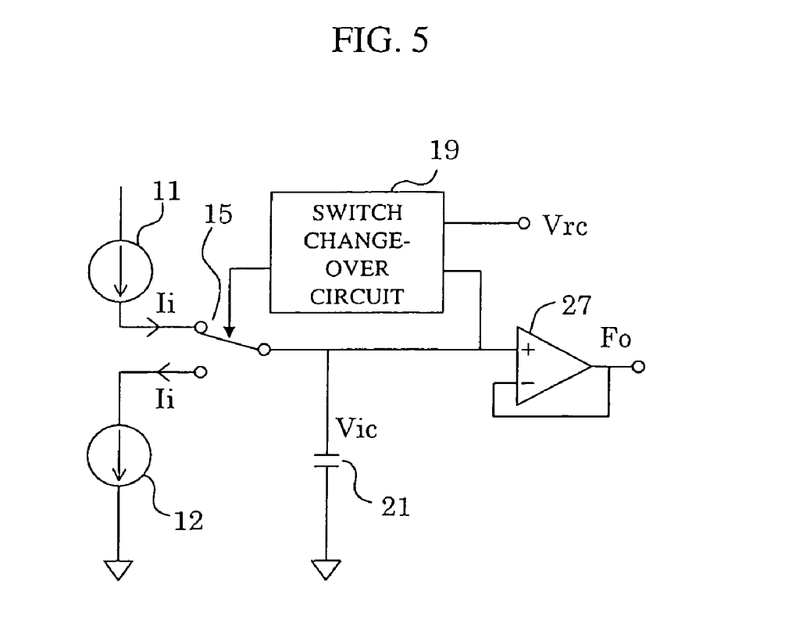
FIG. 5 is a diagram showing the fourth embodiment of the voltage frequency conversion circuit of the frequency output type hot-wire flow meter in accordance with the present invention.

The fourth embodiment of the voltage frequency conversion circuit of the frequency output type hot-wire flow meter of the present invention is described with reference to FIG. 5. The voltage frequency conversion circuit of this embodiment comprises two constant current sources 11 and 12 for supplying the air flow rate current signal Ii that is proportional to the air flow rate voltage signal Vi, a switch 15 for changing over between the two constant current sources 11 and 12, a switch change-over circuit 19 for generating change-over signal to change over the switch 15, an integrating capacitor 21, and a buffer circuit 27. A correction standard voltage Vrc is used for the switch change-over circuit 19.

The voltage frequency conversion circuit of this embodiment is different from the exemplary conventional voltage frequency conversion circuit shown in FIG. 13 in that the correction standard voltage Vrc is used for the switch change-over circuit 19. Using of the correction standard voltage Vrc realizes the non-linear conversion from the air flow rate voltage signal Vi to the output frequency Fo. The non-linearity can be controlled by changing the correction standard voltage Vrc.

The threshold voltages Vthh and Vthl of the switch change-over circuit 19 are controlled so as to be proportional to the correction standard voltage Vrc. The upper threshold voltage Vthh and the lower threshold voltage Vthl are represented by the following equations respectively.

$$Vthh = \alpha \cdot Vrc$$

$$Vthl = \beta \cdot Vrc \qquad \text{Equation 6}$$

The output frequency Fo is obtained by substituting the equation 6 into the equation 5.

$$Fo = Vi/(2 \cdot R \cdot C \cdot Vrc(\alpha - \beta)) \qquad \text{Equation 7}$$
$$= Ii/(2C \cdot Vrc(\alpha - \beta))$$

It can be seen from the right side member of this equation that if the correction standard voltage Vrc is changed to be depends on the air flow rate current signal Ii, the output frequency Fo changes non-linearly with respect to the air flow rate voltage signal Vi. For example, if the correction standard voltage Vrc is controlled to be proportional to the air flow rate current signal Ii, the larger air flow rate current signal Ii results in the large correction standard voltage Vrc. As the result, the output frequency Fo is smaller than that obtained from the proportional relation between the output frequency Fo and the air flow rate current signal Ii. On the other hand, if the correction standard voltage Vrc is controlled to be reversely proportional to the air flow rate current signal Ii, the larger air flow rate current signal Ii result in the smaller correction standard voltage Vrc. As the result, the output frequency Fo is larger than that obtained from the proportional relation between the output frequency Fo and the air flow rate current signal Ii.

Figure 6:
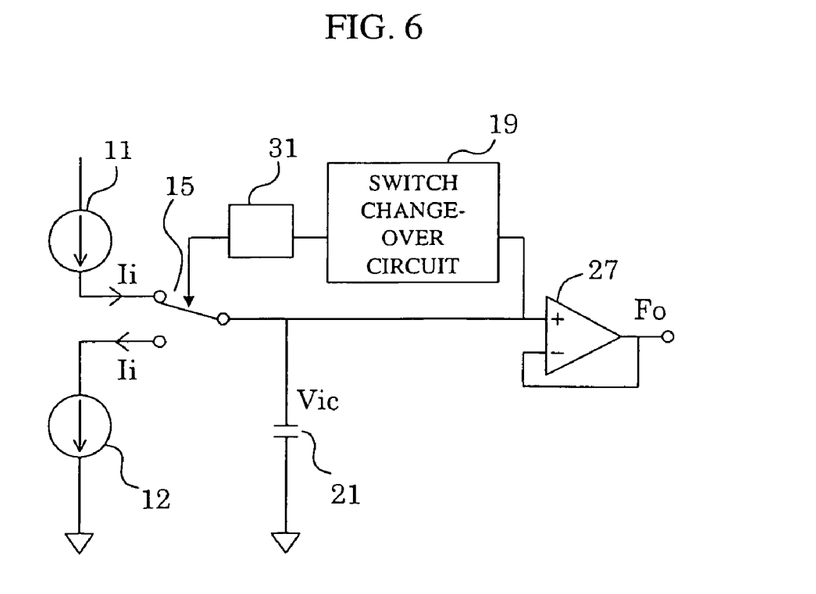
FIG. 6 is a diagram showing the fifth embodiment of the voltage frequency conversion circuit of the frequency output type hot-wire flow meter in accordance with the present invention.

The fifth embodiment of the voltage frequency conversion circuit of the frequency output type hot-wire flow meter of the present invention is described with reference to FIG. 6, FIG. 7, and FIG. 8. The voltage frequency conversion circuit of this embodiment comprises two constant current sources 11 and 12 for supplying the air flow rate current signal Ii that is proportional to the air flow rate voltage signal Vi, a switch 15 for changing over between the two constant current sources 11 and 12, a switch change-over circuit 19 for generating a change-over signal to change over the switch 15, a delaying circuit 31 disposed on the output side of the switch change-over circuit 19, an integrating capacitor 21, and a buffer circuit 27. For example, mono-stable multi-vibrator may be used for the delaying circuit 31 as a constituent.

The voltage frequency conversion circuit of this embodiment is different from the exemplary conventional voltage frequency conversion circuit shown in FIG. 13 in that the delaying circuit 31 is connected to the switch change-over circuit 19. Connection of the delaying circuit 21 to the switch change-over circuit 19 realizes the non-linear conversion from the air flow rate voltage signal Vi to the output frequency Fo.

Figure 7:
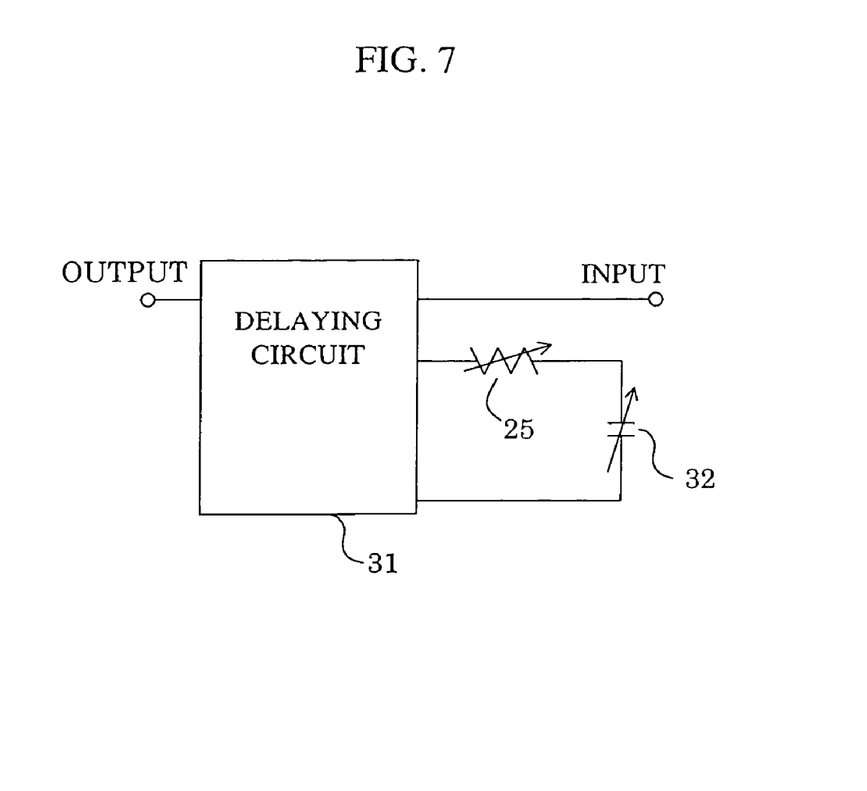
FIG. 7 is a diagram showing a part of the fifth embodiment of the voltage frequency conversion circuit shown in FIG. 6.
Figure 8:
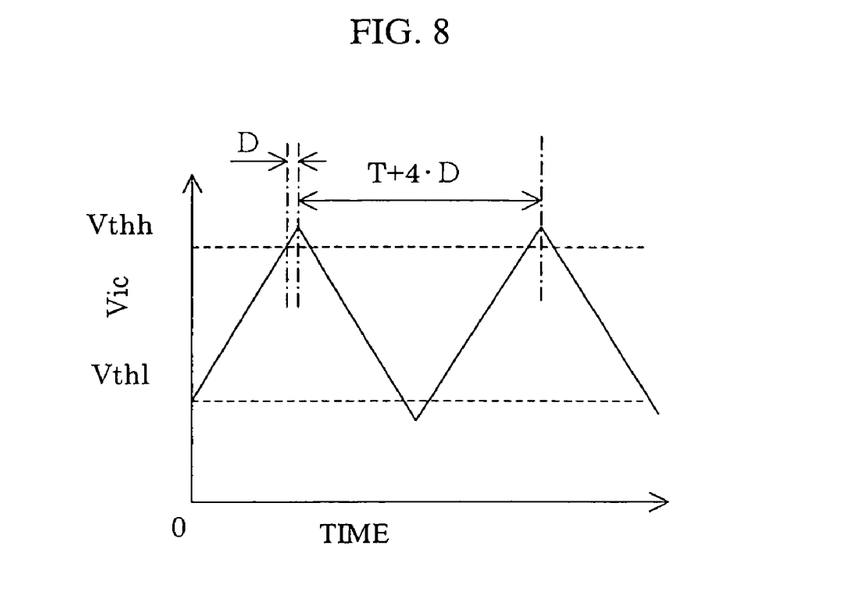
FIG. 8 is a diagram describing the operation of the fifth embodiment of the voltage frequency conversion circuit shown in FIG. 6.

As shown in FIG. 7, the delaying circuit 31 has a correction resistor 25 and a correction capacitor 32 to change the time constant, namely the delay time. The non-linearity can be controlled by changing the delay time of the delaying circuit 31.

The triangular wave generated by means of the voltage frequency conversion circuit of this embodiment is described with reference to FIG. 8. D denotes the delay time of the delaying circuit 31. The changing rate of the voltage Vic of the integrating capacitor 21, namely the gradient of the triangular wave, is proportional to the air flow rate current signal Ii and is independent of the delaying circuit 31. The switch change-over circuit 19 does not generate a change-over signal immediately when the voltage Vic of the integrating capacitor 21 reaches the upper threshold voltage Vthh, but generates a change-over signal for switching from the first constant current source 11 to the second constant current source 12 after delay time D. Next, the switch change-over circuit 19 does not generate a change-over signal immediately when the voltage Vic of the integrating capacitor 21 reaches the lower threshold voltage Vthl, but generates a change-over signal for switching from the second constant current source 12 to the first constant current source 11 after delay time D. Therefore the period of the triangular wave is T+4D for the voltage frequency conversion circuit having the delaying circuit, wherein the period of the triangular wave is T for the voltage frequency conversion circuit having no delaying circuit. The output frequency Fo is represented by the following equation for the voltage frequency conversion circuit having the delaying circuit 31.

$$Fo=1/(T+4D) \qquad \text{Equation 8}$$

Wherein T denotes sum of the time required for the voltage Vic of the integrating capacitor 21 to reach the lower threshold voltage Vthl from the upper threshold voltage Vthh and the time required for the voltage Vic of the integrating capacitor 21 to reach the upper threshold voltage Vthh from the lower threshold voltage Vthl. T changes with the gradient of the triangular wave, in other words, the air flow rate voltage signal Vi. T is obtained according to the equation 2. On the other hand, 4D is constant always. Therefore the output frequency Fo changes non-linearly with respect to the air flow rate voltage signal Vi as shown by the curve NL in FIG. 15B.

The sixth embodiment of the voltage frequency conversion circuit of the frequency output type hot-wire flow meter of the present invention is described with reference to FIG. 9 and FIG. 10. The voltage frequency conversion circuit of this embodiment comprises two constant current sources 11 and 14 disposed in series, a switch 15 for changing over between the two constant current sources 11 and 14, a switch 19 for generating a change-over signal to change over the switch 15, an integrating capacitor 21, and a buffer circuit 27.

The first constant current source 11 supplies the air flow rate current signal Ii that is proportional to the air flow rate voltage signal Vi, and the second constant current source 14 supplies a predetermined constant current $I_{14}$ that is independent of the air flow rate voltage signal Vi.

The voltage frequency conversion circuit of this embodiment is different from the conventionally exemplary voltage frequency conversion circuit shown in FIG. 13 in that the second constant current source 14 supplies a constant current $I_{14}$ that is independent of the air flow rate voltage signal Vi. In this embodiment, the second constant current source 14 supplying a predetermined constant current that is independent of the air flow rate voltage signal Vi realizes the non-linear conversion from the air flow rate voltage signal Vi to the output frequency Fo. The non-linearity can be controlled by changing the value of a predetermined constant current $I_{14}$ supplied from the second constant current source 14.

Figure 9:
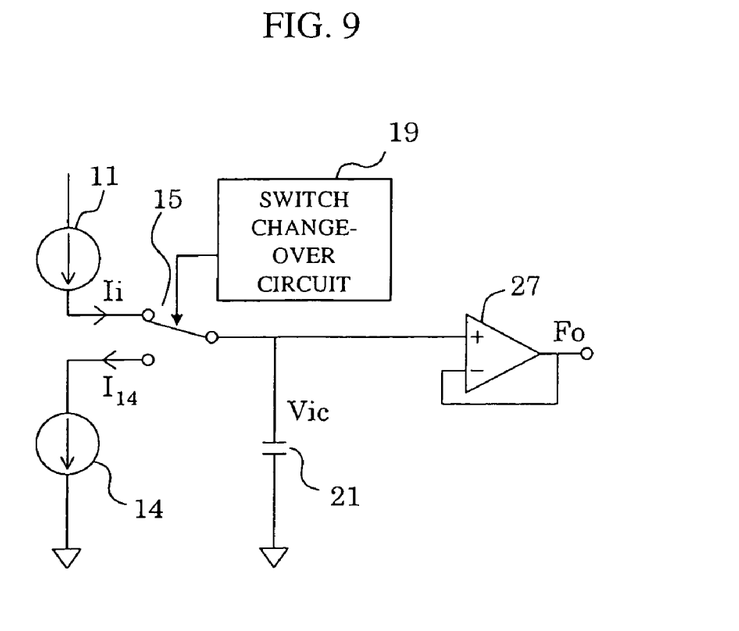
FIG. 9 is a diagram showing the sixth embodiment of the voltage frequency conversion circuit of the frequency output type hot-wire flow meter in accordance with the present invention.
Figure 10:
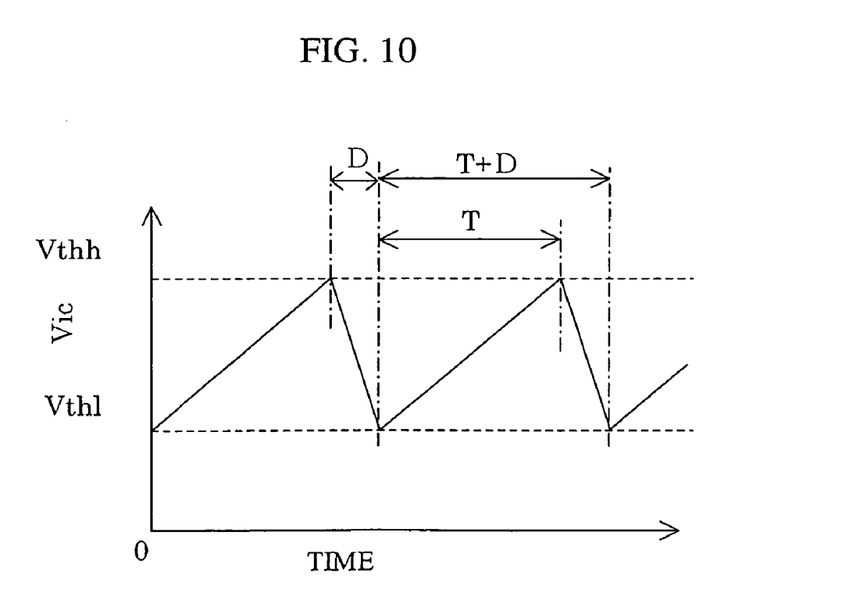
FIG. 10 is a diagram describing the operation of the sixth embodiment of the voltage frequency conversion circuit shown in FIG. 9.

Operation of the voltage frequency conversion circuit shown in FIG. 9 is described with reference to FIG. 10. When the first constant current source 11 is connected to the integrating capacitor 21, the voltage Vic of the integrating capacitor 21 rises. At that time the rising rate of the voltage Vic of the integrating capacitor 21 is proportional to the air flow rate current signal Ii supplied from the first constant current source 11. When the voltage Vic of the integrating capacitor 21 reaches the upper threshold voltage Vthh, the switch change-over circuit 19 generates a change-over signal for switching from the first constant current source 11 to the second constant current source 14. Then the second constant current source 14 is connected to the integrating capacitor 21, and the voltage Vic of the integrating capacitor 21 falls. At that time the falling rate of the voltage Vic of the integrating capacitor 21 is proportional to the constant current $I_{14}$ supplied from the second constant current source 14. The constant current $I_{14}$ supplied from the second constant current source 14 is independent of the air flow rate voltage signal Vi and is constant.

Therefore, by selecting the predetermined value of the constant current $I_{14}$ supplied from the second constant current source 14, the falling rate of the voltage Vic of the integrating capacitor 21 can be controlled. In other words, the predetermined value of the constant current $I_{14}$ is selected to thereby control the time D required for the voltage Vic of the integrating capacitor 21 to reach the lower threshold voltage Vthl from the upper threshold voltage Vthh.

The time T required for the voltage Vic of the integrating capacitor 21 to reach the upper threshold voltage Vthh from the lower threshold voltage Vthl is proportional to the air flow rate voltage signal Vi. However, the time D required for the voltage Vic of the integrating capacitor 21 to reach the lower threshold voltage Vthl from the upper threshold voltage Vthh is determined depending on the constant current $I_{14}$ supplied from the constant current source 14. Therefore the period T of the triangular wave is non-linear with respect to the air flow rate voltage signal Vi. The output frequency Fo is represented by the following equation.

$$Fo=1/(T+D) \qquad \text{Equation 9}$$

Where T is determined according to the equation 2. The time D is a constant to be determined depending on the constant current $I_{14}$ supplied from the second constant current source 14.

Figure 11:
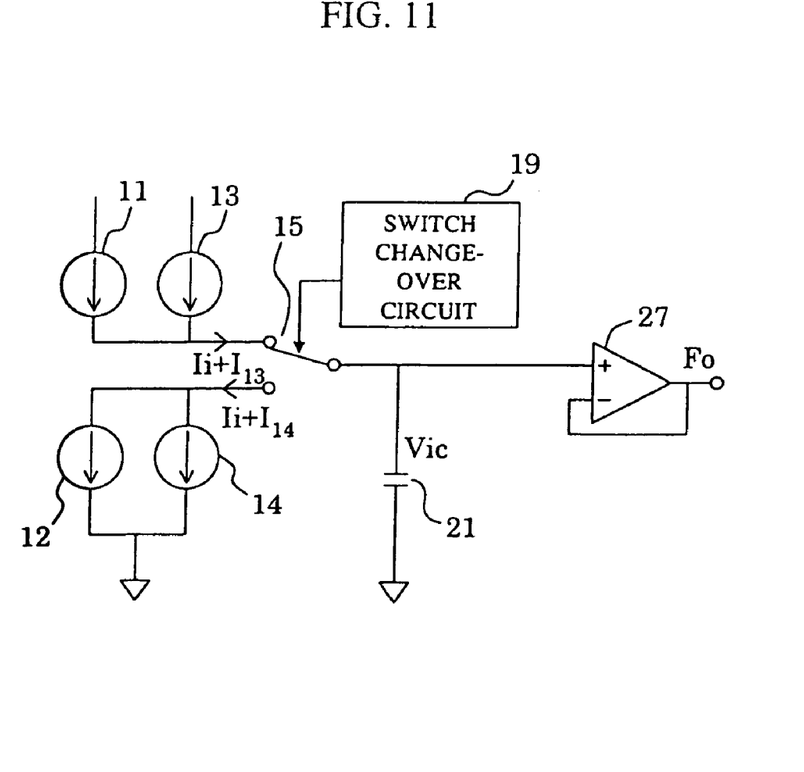
FIG. 11 is a diagram showing the seventh embodiment of the voltage frequency conversion circuit of the frequency output type hot-wire flow meter in accordance with the present invention.

The seventh embodiment of the voltage frequency conversion circuit of the frequency output type hot-wire flow meter of the present invention is described with reference to FIG. 11. The voltage frequency conversion circuit of this embodiment comprises two pairs of constant current sources 11, 13 and 12, 14, a switch 15 for changing over between two pairs of constant current sources 11, 13 and 12, 14, a switch change-over circuit 19 for generating a change-over signal to change over the switch 15, an integrating capacitor 21, and a buffer circuit 27.

Out of the two pair of constant current sources, the first pair of constant current sources 11 and 12 supplies the air flow rate current signal Ii that is proportional to the air flow rate voltage signal Vi, but the second pair of constant current sources 13 and 14 supplies the predetermined constant currents $I_{13}$ and $I_{14}$ that are independent of the air flow rate voltage signal Vi.

The voltage frequency conversion circuit of this embodiment is different from the exemplary conventional voltage frequency conversion circuit shown in FIG. 13 in that the second constant current sources 13 and 14 for supplying the predetermined constant current $I_{13}$ and $I_{14}$ that are independent of the air flow rate voltage signal Vi are provided. The provided second constant current sources 13 and 14 realize the non-linear conversion from the air flow rate voltage signal Vi to the output frequency Fo. The non-linearity can be controlled by changing the value of the constant currents $I_{13}$ and $I_{14}$ supplied from the second constant current sources 13 and 14.

If the voltage Vic of the integrating capacitor 21 is lower than the upper threshold voltage Vthh, the first pair of constant current sources 11 and 13 is connected to the integrating capacitor 21. The sum $I_i+I_{13}$ of the air flow rate current signal Ii that is proportional to the air flow rate voltage signal Vi and the constant current $I_{13}$ that is independent of the air flow rate voltage signal Vi flows into the integrating capacitor 21.

As the result, the voltage Vic of the integrating capacitor 21 rises. At that time the rising rate of the voltage Vic of the integrating capacitor 21 is dependent of the sum of the two currents $I_i+I_{13}$, but not proportional to the air flow rate voltage signal Vi.

When the voltage Vic of the integrating capacitor 21 reaches the upper threshold voltage Vthh, the second pair of constant current sources 13 and 14 are connected to the integrating capacitor 21. The sum current $I_i+I_{14}$ of the air flow rate current signal Ii that is proportional to the air flow rate voltage signal Vi and the constant current $I_{13}$ that is independent of the air flow rate voltage signal Vi flows out from the integrating capacitor 21.

As the result the voltage Vic of the integrating capacitor 21 falls. At that time the falling rate of the voltage Vic of the integrating capacitor 21 is dependent of the sum of the two currents $I_i+I_{14}$, and not proportional to the air flow rate voltage signal Vi.

Therefore, the gradient of the triangular wave is dependent of the sum of the air flow rate current signal Ii that is proportional to the air flow rate voltage signal Vi and the constant current that is independent of the air flow rate voltage signal Vi, and not proportional to the air flow rate voltage signal Vi. In other words, the output frequency Fo changes non-linearly with respect to the air flow rate voltage signal Vi as shown by the curve NL in FIG. 15B.

Embodiments of the present invention are described hereinabove, however, the present invention is by no means limited to the above-mentioned embodiments, and it is understood by those skilled in the art that various changes and modifications may be made in the invention without departing from the spirit and scope thereof.

According to the present invention, the curvature characteristic of the output of a frequency output type hot-wire flow meter is detected in the production process and corrected in the adjustment step, and as the result the production accuracy of the frequency output type hot-wire flow meter is improved.

According to the present invention, the curvature characteristic of the output of a frequency output type hot-wire flow meter can be controlled without using a correction LSI and a microcomputer.

What is claimed is:

1. A frequency output type hot-wire flow meter comprising a heating resistor disposed in a measurement target fluid and a voltage frequency conversion circuit for converting an air flow rate voltage signal obtained from said heating resistor to a frequency,
    wherein when the relationship between the actual air flow rate and said air flow rate voltage signal is deviated from a standard characteristic, said voltage frequency conversion circuit generates an output frequency that is non-linear with respect to said flow rate voltage signal so that said output frequency is linear with respect to said actual air flow rate.

2. A frequency output type hot-wire flow meter comprising a heating resistor disposed in a measurement target fluid and a voltage frequency conversion circuit for converting a flow rate voltage signal obtained from said heating resistor to a frequency, said voltage frequency conversion circuit comprising a first integrating capacitor, two current sources for providing a flow rate current signal that is proportional to said flow rate voltage signal in a direction to increase and in a direction to decrease a voltage of said first integrating capacitor, a switch for connecting said two current sources to said first integrating capacitor alternately, and a switch change-over circuit for generating a change-over signal to change over said switch so that a frequency of a triangular wave obtained from said voltage of said first integrating capacitor is output as an output frequency,
    wherein said voltage frequency conversion circuit generates said output frequency that is non-linear with respect to said flow rate voltage signal by means of a correction resistor connected to said first integrating capacitor.

3. The frequency output type hot-wire flow meter according to claim 2, wherein said voltage frequency conversion circuit comprises a correction resistor connected in parallel to said first integrating capacitor.

4. The frequency output type hot-wire flow meter according to claim 2, wherein said voltage frequency conversion circuit comprises a correction resistor connected in series to said first integrating capacitor and a third current source for supplying a constant current to a connection point between said first integrating capacitor and said correction resistor.

5. The frequency output type hot-wire flow meter according to claim 2, wherein said voltage frequency conversion circuit comprises a second integrating capacitor connected in parallel to said first integrating capacitor and a correction resistor connected between said first and second integrating capacitors.

6. A frequency output type hot-wire flow meter comprising a heating resistor disposed in a measurement target fluid and a voltage frequency conversion circuit for converting a flow rate voltage signal obtained from said heating resistor to a frequency, said voltage frequency conversion circuit comprising an integrating capacitor, two current sources for providing a flow rate current signal that is proportional to said flow rate voltage signal in a direction to increase and in a direction to decrease a voltage of said integrating capacitor, a switch for connecting said two current sources to said integrating capacitor alternately, a switch change-over circuit for generating a change-over signal to change over said switch when said voltage of said integrating capacitor reaches an upper threshold voltage or a lower threshold voltage so that a frequency of a triangular wave obtained from said voltage of said integrating capacitor is output as an output frequency,
    wherein said switch change-over circuit has a correction standard voltage, and a timing for generating said change-over signal is changed based on said correction standard voltage to thereby generate said output frequency that is non-linear with respect to said flow rate voltage signal.

7. A frequency output type hot-wire flow meter comprising a heating resistor disposed in a measurement target fluid and a voltage frequency conversion circuit for converting a flow rate voltage signal obtained from said heating resistor to a frequency, said voltage frequency conversion circuit comprising an integrating capacitor, two current sources for providing a flow rate current signal that is proportional to said flow rate voltage signal in a direction to increase and in a direction to decrease a voltage of said integrating capacitor, a switch for connecting said two current sources to said integrating capacitor alternately, a switch change-over circuit for generating a change-over signal to change over said switch when said voltage of said integrating capacitor reaches an upper threshold voltage or a lower threshold voltage so that a frequency of a triangular wave obtained from said voltage of said integrating capacitor is output as an output frequency, wherein said switch change-over circuit has a delaying circuit, and a timing for generating said change-over signal is changed by means of said delaying circuit to thereby generate said output frequency that is non-linear with respect to said flow rate voltage signal.

8. The frequency output type hot-wire flow meter according to claim 7, wherein said delaying circuit has a correction resistor and a correction capacitor, and said correction resistor and said correction capacitor together control a delaying time of said change-over signal.

9. A frequency output type hot-wire flow meter comprising a heating resistor disposed in a measurement target fluid and a voltage frequency conversion circuit for converting a flow rate voltage signal obtained from said heating resistor to a frequency, said voltage frequency conversion circuit comprising an integrating capacitor, two current sources for providing a current signal in a direction to increase and in a direction to decrease a voltage of said integrating capacitor, a switch for connecting said two current sources to said integrating capacitor alternately, and a switch change-over circuit for generating a change-over signal to change over said switch when said voltage of said integrating capacitor reaches an upper threshold voltage or a lower threshold voltage so that a frequency of a triangular wave obtained from said voltage of said integrating capacitor is output as an output frequency, wherein one of said two current sources provides a flow rate current signal that is proportional to said flow rate voltage signal in the direction to increase said voltage of said integrating capacitor, and the other one of said two current sources provides a predetermined constant current in the direction to decrease said voltage of said integrating capacitor to thereby generate said output frequency that is non-linear with respect to said flow rate voltage signal.

10. A frequency output type hot-wire flow meter comprising a heating resistor disposed in a measurement target fluid and a voltage frequency conversion circuit for converting a flow rate voltage signal obtained from said heating resistor to a frequency, said voltage frequency conversion circuit comprising an integrating capacitor, two current sources for providing a flow rate current signal that is proportional to said flow rate voltage signal in a direction to increase and in a direction to decrease a voltage of said integrating capacitor, a switch for connecting said two current sources to said integrating capacitor alternately, and a switch change-over circuit for generating a change-over signal to change over said switch when said voltage of said integrating capacitor reaches an upper threshold voltage or a lower threshold voltage so that a frequency of a triangular wave obtained from said voltage of said integrating capacitor is output as an output frequency, wherein said flow meter further comprises a third current source for providing a predetermined constant current signal in the direction to increase said voltage of said integrating capacitor; and a fourth current source for providing a predetermined constant current signal in the direction to decrease said voltage of said integrating capacitor to thereby generate said output frequency that is non-linear with respect to said flow rate voltage signal.

* * * * *